(12) United States Patent
Desmet et al.

(10) Patent No.: US 11,214,700 B2
(45) Date of Patent: Jan. 4, 2022

(54) AQUEOUS DISPERSION OF POLYMERIC CAPSULES

(71) Applicant: AGFA-GEVAERT NV, Mortsel (BE)

(72) Inventors: Tim Desmet, Mortsel (BE); Johan Loccufier, Mortsel (BE)

(73) Assignee: AGFA-GEVAERT NV, Mortsel (BE)

(*) Notice: Subject to any disclaimer, the term of this patent is extended or adjusted under 35 U.S.C. 154(b) by 90 days.

(21) Appl. No.: 16/623,817

(22) PCT Filed: Jun. 15, 2018

(86) PCT No.: PCT/EP2018/065946
§ 371 (c)(1),
(2) Date: Dec. 18, 2019

(87) PCT Pub. No.: WO2018/234179
PCT Pub. Date: Dec. 27, 2018

(65) Prior Publication Data
US 2020/0115575 A1    Apr. 16, 2020

(30) Foreign Application Priority Data

Jun. 22, 2017 (EP) .................................. 17177418

(51) Int. Cl.
*C09D 11/326* (2014.01)
*B01J 13/16* (2006.01)
(Continued)

(52) U.S. Cl.
CPC ............. *C09D 11/326* (2013.01); *B01J 13/16* (2013.01); *B41J 3/4078* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/033; C09D 11/037; C09D 151/08; B41J 11/0021; B41J 2/11; B41J 2/17; B41J 2/17593; B41J 2/1755; B41J 2/2114; B41J 2/2117; B41J 2/2056;
(Continued)

(56) References Cited

U.S. PATENT DOCUMENTS 5,853,861 A    12/1998  Held
2007/0157849 A1  7/2007  Kluge et al.
(Continued)

FOREIGN PATENT DOCUMENTS

EP    2 933 374 A1    10/2015
EP    3 156 463 A1    4/2017
(Continued)

OTHER PUBLICATIONS

Official Communication issued in International Patent Application No. PCT/EP2018/065946, dated Feb. 12, 2019.
(Continued)

*Primary Examiner* — Manish S Shah
(74) *Attorney, Agent, or Firm* — Leydig, Voit & Mayer, Ltd.

(57) ABSTRACT

An aqueous dispersion of capsules including a resin having at least one repeating unit of formula I, II, and/or III and which is obtainable by contacting, in a liquid including water, a compound A including at least 2 functional groups selected from the functional groups —X—C(=O)—CHR1-C(=O)—R2, —X—C(=O)—C≡C—R2; or —X—C(=O)—CR1=CR2-NR11R12, with a compound B including at least two of —NH$_2$, —NH$_3^{++}$, or —N=C=O. A method of producing the aqueous dispersion further relates to an aqueous ink jet ink including the resin capsules.

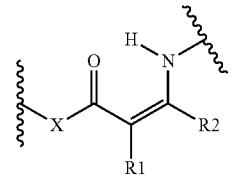

(I)

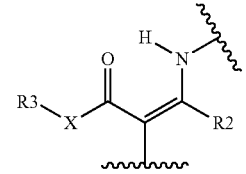

(II)

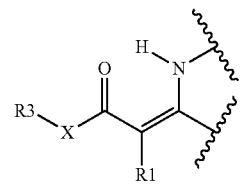

(III)

18 Claims, No Drawings

(51) Int. Cl.
*B41J 3/407* (2006.01)
*B41M 5/00* (2006.01)
*B41M 7/00* (2006.01)
*C09D 11/102* (2014.01)
*D06P 1/52* (2006.01)
*D06P 5/30* (2006.01)
*D06P 3/52* (2006.01)
*D06P 3/60* (2006.01)
*D06P 3/82* (2006.01)

(52) U.S. Cl.
CPC .......... *B41M 5/0023* (2013.01); *B41M 7/009* (2013.01); *C09D 11/102* (2013.01); *D06P 1/5264* (2013.01); *D06P 5/30* (2013.01); *D06P 3/52* (2013.01); *D06P 3/60* (2013.01); *D06P 3/8223* (2013.01)

(58) Field of Classification Search
CPC ...... B41J 2/0057; B41J 3/60; B41J 2002/012; B41J 2/04588; B41J 2/04595; B41J 2/04586; B41J 2/14274; B41J 2/1623; B41J 2202/00; B41J 2202/03; B41J 2/045; B41J 11/0015; B41J 11/002; B41J 2/04581; B41J 2/055; B41J 2/16538; B41J 2/14201; B41J 2002/16502; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 25/001; B41J 25/312; B41J 25/34; B41J 25/003; B41J 2/21; B41J 2025/008; B41J 2202/21; B41J 2/17596; B41J 2/16508; B41J 2/1652; B41J 2/175; B41J 2/17563; B41J 11/00; B41J 2/2107; B41J 2/01; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; B41M 5/0076; G02B 5/20; G02B 5/223; C08K 3/11; C08K 2003/2237; C14C 11/006
See application file for complete search history.

(56) References Cited

U.S. PATENT DOCUMENTS

2009/0226678 A1 9/2009 Yatake et al.
2011/0124799 A1* 5/2011 Li .................. C09D 11/322
524/542
2012/0306976 A1 12/2012 Kitagawa et al.
2018/0216289 A1* 8/2018 Petton ................. C09D 11/322

FOREIGN PATENT DOCUMENTS

WO 03/029362 A2 4/2003
WO 2005/083017 A1 9/2005
WO 2016/097169 A1 6/2016

OTHER PUBLICATIONS

Sanchez-Sanchez et al., "pH-responsive single-chain polymer nanoparticles utilising dynamic covalent enamine bonds", Royal Society of Chemistry, ChemComm Communication, vol. 50, Jan. 2, 2014, 6 pages.

* cited by examiner

AQUEOUS DISPERSION OF POLYMERIC CAPSULES

CROSS REFERENCE TO RELATED APPLICATIONS

This application is a 371 National Stage Application of PCT/EP2018/065946, filed Jun. 15, 2018. This application claims the benefit of European Application No. 17177418.5, filed Jun. 22, 2017, which is incorporated by reference herein in its entirety.

BACKGROUND OF THE INVENTION

1. Field of the Invention

The present invention relates to aqueous dispersions of capsules having a resin comprising dynamic covalent polymeric chains for use in aqueous inkjet inks, more specifically aqueous inkjet inks for textile printing.

2. Description of the Related Art

In textile printing, there is a clear evolution from classical textile printing technologies such as screen printing towards digital printing. Additionally, there is a tendency to go from dye based inks to pigment based inks. Inks for textile printing are mainly based on reactive or acid dyes which require after the printing step additional steaming and washing processes. These processes require special equipment and consume a high amount of water and energy resources. Pigment based inks for textile printing hold the promise that no additional steaming and washing is required. Furthermore, pigment based inks are compatible with different fibres, both natural fibres such as cellulose based fibres e.g. in cotton and synthetic fibres such as polyester and polyamide. Pigment based inks also allow to print on mixed fibre fabrics.

To bind the pigments to the different types of fibre, reactive binder technology has been introduced into the inks. This binding is required to achieve a satisfactory level in wash fastness and fastness during rubbing, also known as crock fastness. Several approaches have been disclosed in the patent literature.

WO2003/029362 discloses an ink composition comprising at least one pigment, at least one dispersed resin selected from the group consisting of acrylic acrylonitrile resins, styrene-acrylic resins, acrylic-butadiene resins, butadiene acrylonitrile resins and polyurethane resins, at least one crosslinker and a liquid medium. Melamine resins are disclosed as particularly preferred resins.

WO2005/083017 discloses an ink for textile printing comprising specific wetting agents for spreading control. The inks comprise a polyurethane as pigment dispersing agent in combination with a melamine as fixing agent.

WO2009/137753 discloses an ink composition comprising a colorant, a specific crosslinked polyurethane designed for hydrolytical stability and a post curing agent selected from the group consisting of amide and amine formaldehyde resins, phenolic resins, urea resins and blocked isocyanates, with melamine formaldehyde resins as preferred embodiment.

U.S. Pat. No. 5,853,861 discloses an ink textile combination, where the ink comprises at least on pigment and a polymer having a functional group selected from an acid, a base, an epoxy and a hydroxyl group and where the textile comprises at least one specific functional group selected from the group consisting of a hydroxyl, an amine, an amide and a carbonyl moiety and a crosslinker selected from specific organometallic compounds and isocyanates.

US2009/0226678 discloses an ink set comprising a fixing liquid and an ink comprising a pigment dispersion. The fixing agent comprises specific polymer particles with a Tg below −10° C. and a reactant, preferably a blocked isocyanate dispersion.

US2012/0306976 discloses an ink comprising a pigment, a dispersing agent for said pigment, typically an acrylate based resin, a water soluble fixing agent, typically a water soluble polymer such as a poly(vinyl alcohol) derivative or a polyurethane based resin and a crosslinking agent, preferably a blocked isocyanate capable of crosslinking the dispersant and the polymer fixing agent upon thermal treatment at a temperature of at least 100° C.

EP 29333374 discloses the use of encapsulated reactive chemistry in pigment containing aqueous inkjet inks, to manufacture printed textiles. Blocked isocyanates are disclosed as preferred reactive chemistry upon thermal treatment. These blocked isocyanates are multifunctional low molecular weight blocked isocyanates which can, if not completely consumed during the thermal treatment, lead to health and safety issues when the printed textile comes into contact with the consumer. The encapsulation technology as disclosed in EP29333374 is characterized in that the shell of the capsules is not reactive upon the thermal treatment and does not participate into the binding process of the pigment onto the fibres of the fabric. This results in a decrease of the adhesion of the pigment to the fibre and an increase of the stiffness of the fabric which is mostly unwanted, especially in textiles for apparel such as T-shirts, skirts, swimwear, etc.

On one hand, there is a need for capsules which shell does participate into the binding process of the pigment to the fibre. On the other hand, there is the need for an approach that allows to achieve a satisfactory binding between the pigment of an aqueous ink and the fibre of the fabric upon heating without the need of reactive chemistry such as blocked isocyanates and formaldehyde based crosslinkers and which do not negatively affect the physical properties of the printed fabric.

WO2016/097169 discloses polymeric networks which combine great mechanical properties and a suitable glass transition temperature with dynamically exchange crosslinking bonds at elevated temperatures such as vinylogous-urethane, vinylogous-amide or vinylogous urea. These materials are prepared by bulk polymerisation leading to a paste and does not lead to aqueous dispersions without grinding and dispersing the obtained particles in aqueous medium.

Sanchez et al. disclose in Chem. Commun. 2014, 50, 1871 vinylogous urethanes as exchangeable and reversible links in single chain polymer particles based on radically polymerized (meth)acrylates. The particles are formed in THF and precipitate in water so as to isolate them.

SUMMARY OF THE INVENTION

It is the object of the present invention to provide a solution to the above stated problems. The object has been achieved by providing an aqueous dispersion of polymeric capsules as defined below.

It is further an object of the present invention to provide an inkjet ink comprising the above-mentioned capsules as defined below.

It is another embodiment of the invention to provide a production method of the above-mentioned dispersion of polymeric capsules as defined below.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE PREFERRED EMBODIMENTS

According to a first aspect of the present invention, an aqueous dispersion of capsules is provided, said capsules are composed of a shell surrounding a core, the resin having at least one repeating unit of formula (I), (II), and/or (III),

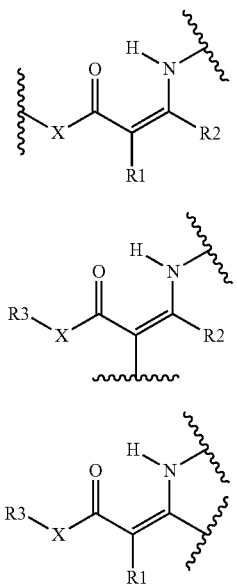

wherein R1 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, COR4 and CN R2 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group and COR4

$R_1$ and $R_2$ may represent the necessary atoms to form a five to eight membered ring R3 is selected from the group consisting of a substituted or unsubstituted alkyl group, a substituted or unsubstituted alkenyl group, a substituted or unsubstituted alkynyl group and a substituted or unsubstituted aryl or heteroaryl group R4 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, OR5 and NR6R7

R5 is selected from the group consisting of a substituted or unsubstituted alkyl group, a substituted or unsubstituted alkenyl group, a substituted or unsubstituted alkynyl group and a substituted or unsubstituted aryl or heteroaryl group R6 and R7 are independently selected from the group consisting of a hydrogen, a substituted or unsubstituted alkyl group, a substituted or unsubstituted alkenyl group, a substituted or unsubstituted alkynyl group and a substituted or unsubstituted aryl or heteroaryl group R6 and R7 may represent the necessary atoms to form a five to eight membered ring X is selected from the group consisting of O, NR8 and CR9R10

R8, R9 and R10 are independently selected from the group consisting of a hydrogen, a substituted or unsubstituted alkyl group, a substituted or unsubstituted alkenyl group, a substituted or unsubstituted alkynyl group and a substituted or unsubstituted aryl or heteroaryl group R8 and R3 may represent the necessary atoms to form a five to eight membered ring any of R3, R9 and R10 may represent the necessary atoms to form a five to eight membered ring, and which is obtainable by contacting in a liquid comprising water, a compound A comprising at least 2 functional groups selected from the group of functional groups —X—C(=O)—CHR1-C(=O)—R2, —X—C(=O)—C≡C—R2; or —X—C(=O)—CR1=CR2-NR11R12, with a compound B comprising at least two —$NH_2$, —$NH_3^+$ or —N=C=O wherein R11 and R12 are independently selected from the group consisting of a hydrogen, a substituted or unsubstituted alkyl group, a substituted or unsubstituted alkenyl group, a substituted or unsubstituted alkynyl group and a substituted or unsubstituted aryl or heteroaryl group.

In some preferred embodiments, the resin composition of the capsules is made of vinylogous-urethane, vinylogous-amide, vinylogous-urea units or a combination thereof. Vinylogous urethanes are compounds containing the chemical functionality —N—C=C—C(=O)—O—. Vinylogous urea are compounds containing the chemical functionality —N—C=C—C(=O)—NR—. Vinylogous amide are compounds containing the chemical functionality —N—C=C—C(=O)—CRR'—.

In a preferred embodiment, the resin particle according to the present invention comprises at least one moiety according to formula I. In a further preferred embodiment, X represents O. In a further preferred embodiment R1 is selected from the group consisting of a hydrogen, a substituted or unsubstituted alkyl group and a substituted or unsubstituted aryl group, a hydrogen being particularly preferred. In another preferred embodiment, R2 is selected from the group consisting of a substituted or unsubstituted alkyl group and a substituted or unsubstituted aryl group. In the most preferred embodiment R2 represents a C1 to C6 alkyl group, a methyl group being the most preferred.

A. Preparation of the Aqueous Dispersion

A.1. Liquid

The aqueous dispersion can be obtained by reacting at least 2 compounds in a liquid which comprises water. Preferably the liquid is a mixture of water and an organic solvent which is not soluble in water. Non-solubility in water is defined as any water solvent combination forming a two phase system at 20° C. when mixed in a one over one volume ratio. In a particularly preferred embodiment, the water insoluble solvent has a boiling point below 100° C. at normal pressure. Esters are particularly preferred as water immiscible solvent. Suitable examples are ethyl acetate, propyl acetate, isopropyl acetate, methyl acetate, propyl formate, butyl formate, isopropyl formate, isopropyl acetate and ethyl acetate being more preferred, ethyl acetate being the most preferred.

A.2. Compound A

Compound A comprises at least 2 functional groups selected from the group of functional groups of formula —X—C(=O)—CHR1-C(=O)—R2, —C(=O)—C≡C—R2; or —C(=O)—CR1=CR2-NR4R5. Compound A can also be an oligomer or polymer from monomers comprising functional groups selected from the group of functional groups of formula —X—C(=O)—CHR1-C(=O)—R2, —C(=O)—C≡C—R2; or —C(=O)—CR1=CR2-NR4R5. Preferably, compound A are bis-acetoacetate monomers which can easily be prepared from readily available diol monomers. (a) J. S. Witzeman, W. D. Nottingham, The Journal of Organic Chemistry 1991, 56, 1713; b) R. J. Clemens, J. A. Hyatt, The Journal of Organic Chemistry 1985, 50, 2431). Non-limiting examples of suitable acetoacetates comprise compounds as exemplified in Table 1:

TABLE 1

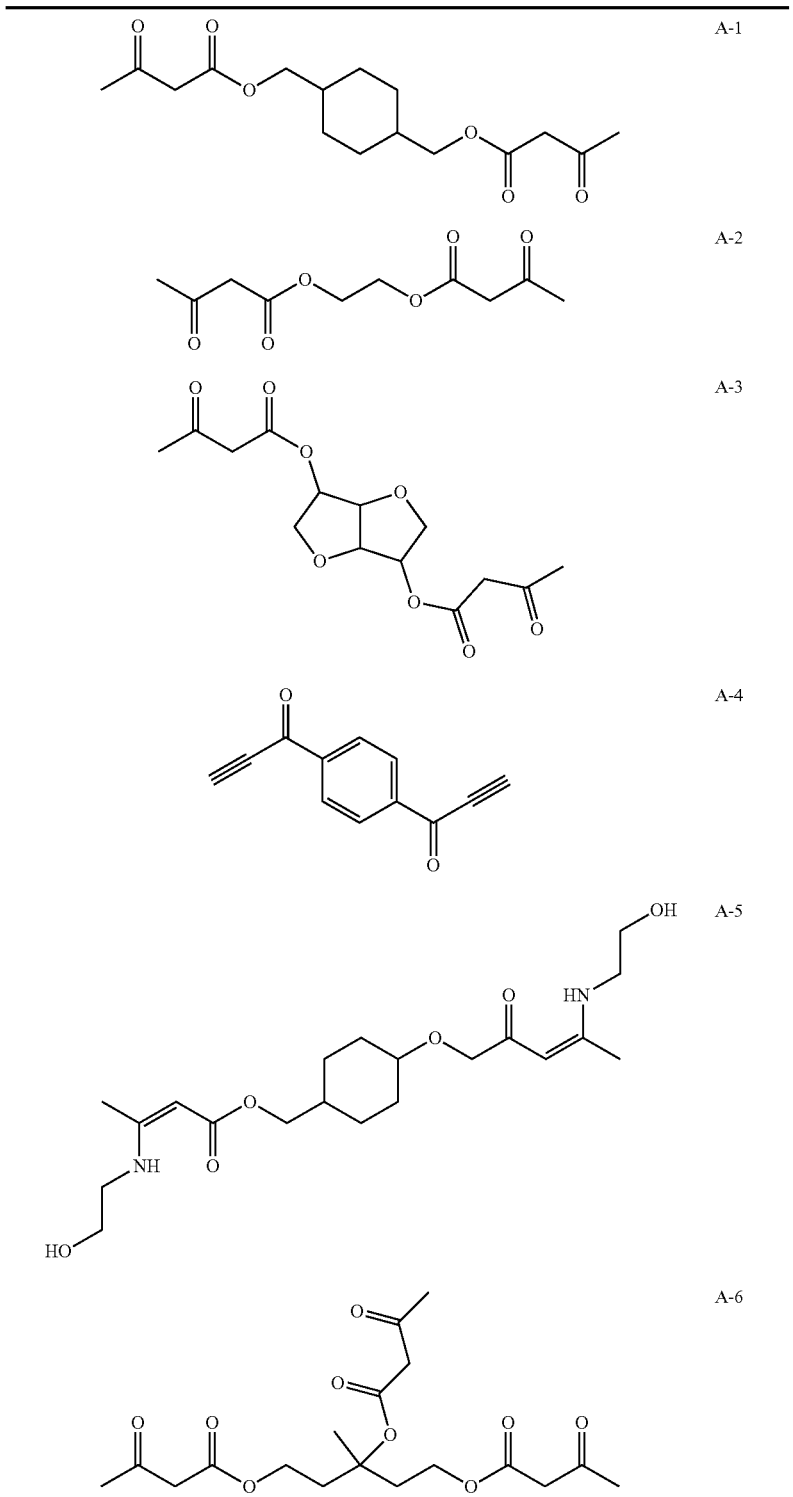

TABLE 1-continued

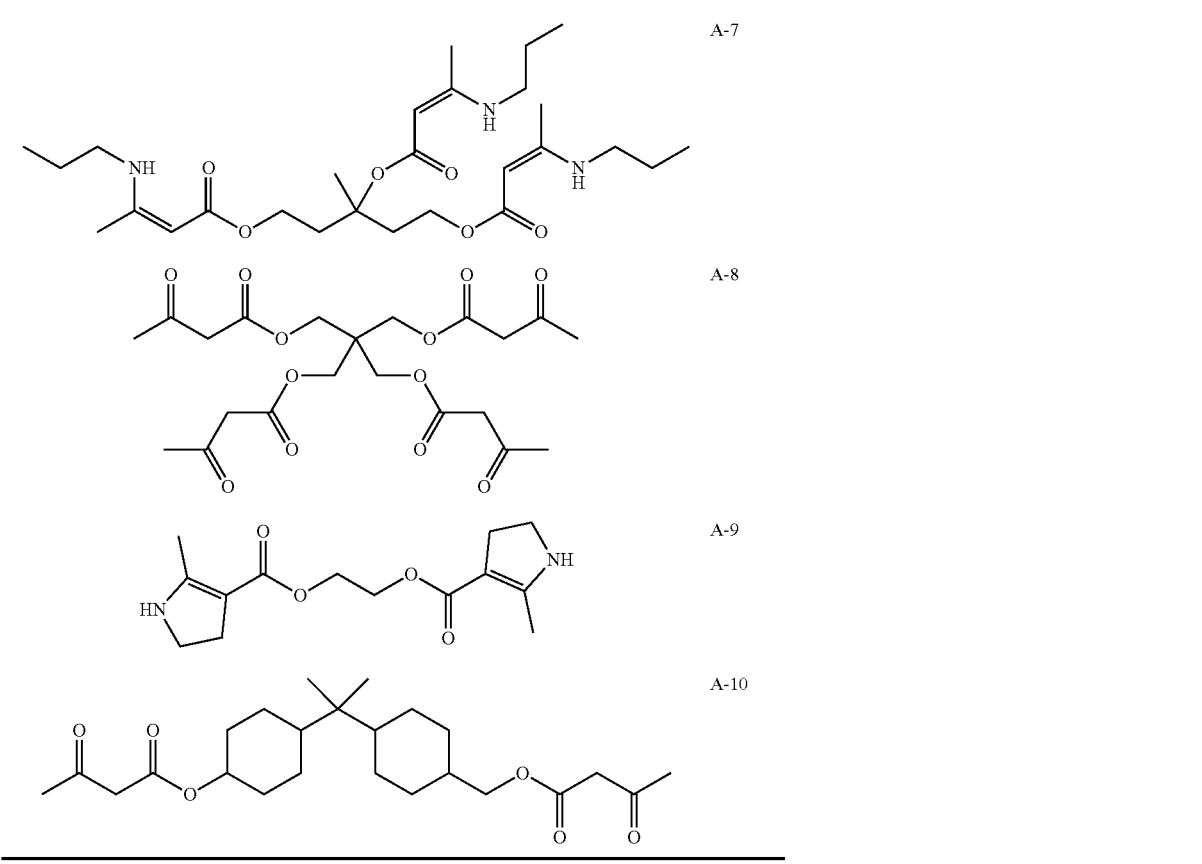

Compound A can be an acetoacetylated derivative of alcohol, such as acetoacetylated derivative of Pripol™2030 (from Croda). For example, compound A can be an acetoacetylated derivative of an alcohol selected from the group comprising aliphatic polyols, preferably aliphatic polyols without ester functions, such as cyclohexane dimethanol, 4,4'-Isopropylidenedicyclohexanol, 1,2-benzene dimethanol, 2,2'-biphenyl dimethanol, Trans-1, 2-cyclohexanediol; 1,4-Bis(2-hydroxyisopropyl)benzene; Cis-cyclopentanediol; 3,3-Dimethyl-1, 2-butanediol; 2,4-Dimethyl-2, 4-pentanediol; 1,3-Dioxane-5, 5-dimethanol; trans-1, 4-Dioxane-2, 3-diol; 2, 2,4,4-Tetramethyl-1, 3-cyclobutanediol; hydrobenzoin, hydroquinone bis(2-hydroxyethyl) ether; 3-Methoxy-1, 2-propanediol; 3-Morpholino-1, 2-propanediol; 2, 2'-(o-Phenylenedioxy)diethanol; 2, 2,4-Trimethyl-1, 3-pentanediol 97%; 4,4'-Isopropylidenebis[2-(2, 6-dibromophenoxy)ethanol]; D-isosorbide; Pripol 2033; Di(trimethylolpropane); 3-methyl-1, 3,5-pentanetriol technical grade; Triisopropanolamine; pentaerythritol; polyvinyl alcohol and copolymers thereof; dipentaerythritol.

In a particularly preferred embodiment, said compound A comprises at least two functional group according to —X—C(=O)—CHR$_1$—C(=O)R$_2$. In a more preferred embodiment, compound A comprises two functional groups according to —X—C(=O)—CHR$_1$—C(=O)R$_2$. In a more preferred embodiment R$_1$ represents a hydrogen and R$_2$ is selected from the group consisting of a substituted or unsubstituted alkyl group and a substituted or unsubstituted aryl group, a C1 to C6 alkyl group being even more preferred. Bis acetoacetate monomers are the most preferred.

A.3. Compound B

Preferably, compound B is an amine compound and can be selected from the group comprising diamines, triamines and polyamines. In some embodiment, compound B can be an amine such as those used as isocyanate precursor, such as diamines of the formula R (—NH$_2$)$_x$, wherein R is a functional linking group comprising 2 to 20 carbon atoms, selected from aliphatic, cycloaliphatic, aromatic and hetero aromatic groups.

Diamines are particularly preferred as compound B. In a particularly preferred embodiment, said compound B is represented by formula IV Formula IV

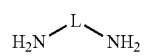

wherein L is selected from the group consisting of a substituted or unsubstituted alkylene group, a substituted or unsubstituted alkenylene group, a substituted or unsubstituted alkynylene group, a substituted or unsubstituted alkarylene group, a substituted or unsubstituted aralkylene group and a substituted or unsubstituted arylene group, a substituted or unsubstituted alkylene group being particularly preferred.

Compound B may be chosen, for example, from aliphatic amines such as tris(2-aminoethyl)amine, ethylenediamine, tetramethylenediamine, pentamethylenediamine, hexamethylenediamine, diethylenetriamine, triethylenetetramine, tetraethylenepentamine, dihexylenetriamine, cadaverine, putrescine, hexanediamine, spermine, isophorone diamine, dimerised fatty diamine (such as are available commercially under the trade name "Priamine" from Croda International and the trade name "Versamine" from Cognis Corporation) and also aromatic and benzylic amines such as m-xylenediamine; phenylenediamine, diaminodiphenylmethane, diaminodiphenyl sulfone and methylenebischlorodiethylaniline. Non-limiting examples include m-xylylene diamine; p-xylylenediamine; 1,3-Cyclohexanebis(methylamine), mixture of isomers; 1,2-Diaminocyclohexane; 1,5-Diamino-2-methylpentane; 4,9-Dioxa-1, 12-dodecanediamine; Dytek® EP diamine; 2,2-Dimethyl-1, 3-propanediamine; 2,2'-(Ethylenedioxy)bis(ethylamine); Tris(2-aminoethyl)amine; 4,4'-Methylenebis(cyclohexylamine); 4, 7, 10-Trioxa-1,13-tridecanediamine; all jeffamines (commercially available from Huntsman). Non-limiting examples of suitable compound B are shown in Table 2.

TABLE 2

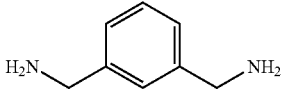
B-1

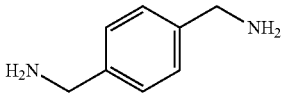
B-2

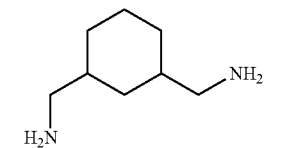
B-3

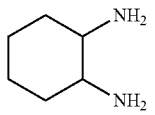
B-4

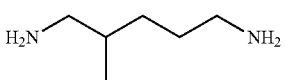
B-5

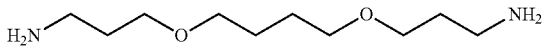 [SMILES: NCCCOCCCCOCCCN]
B-6

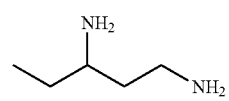
B-7

B-8

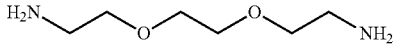
B-9

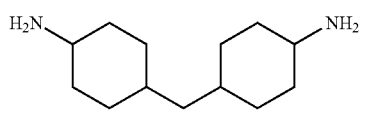 [SMILES: NC1CCC(CC2CCC(N)CC2)CC1]
B-10

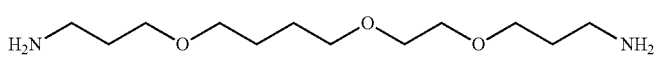
B-11

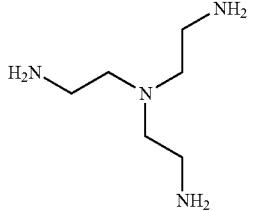
B-12

A.4. Reaction of Compound A with Compound B

In one embodiment of the invention, compound A can react with compound B by bringing both compounds in an organic solvent together. The choice of the organic solvent is determined by the solubility of compound A and B. Preferably the organic solvent is selected from the group of ketones such as acetone and methyl ethyl ketone, ethers such as tetrahydrofuran and dioxalane and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more. Once the reaction between compound A and B is complete, hence the amount of one of the 2 compounds is substantially zero, the reaction mixture comprising the formed resin is brought into a liquid comprising water where the resin is becoming a particle. The organic solvent is then removed by evaporation, pervaporation, membrane techniques or distillation. According to this method of producing, a dispersion of particles is obtained wherein the particles comprise a resin having a repeating unit according to formula I, II or III.

In a preferred embodiment of the invention, the aqueous dispersion of capsules is formed according to the invention via interfacial polymerization. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)). In interfacial polymerization, such as interfacial polycondensation, the compound A and compound B meet at the interface of emulsion droplets and react rapidly with each other. Interfacial polymerisation requires a liquid comprising the dispersion of an oleophilic phase in an aqueous continuous phase or vice versa. Each of the phases contains at least one dissolved compound A that is capable of reacting with compound B dissolved in the other phase. Upon polymerisation, the resin having a moiety of formula (I), (II), and/or (III) is formed that is insoluble in both the aqueous and the oleophilic phase and forms capsules which grow upon further polymerisation.

The capsules according to the present invention are preferably prepared from an oleophilic dispersion in an aqueous continuous phase, the oleophilic phase preferably comprising compound A, the aqueous continuous phase comprising compound B. The oleophilic phase is in a particularly preferred embodiment, the non-water soluble organic solvent and is removed by solvent stripping before or after the particle formation.

Esters are particularly preferred as water immiscible solvent, for example ethyl acetate is particularly useful.

The dispersing of an oleophilic phase in an aqueous continuous phase can be performed by any known method in art, but is preferably performed by means of high shear equipment such as an Ultraturax T25 (Ika). The dispersed phase can be stabilised by emulsifying agents such as hydrophilic polymers such as polyvinyl alcohol, polyethylene oxides and derivatives, such as poloxamers, commercially available as Pluronics from BASF or Synperonics from Croda, starch and starch-derivatives, sugars and non-reducing sugars such as sorbitol. Additionally the use of surfactants, both anionic, cationic or non-ionic can be used to stabilise the dispersion. Examples include the agents but are not limited to described in § B.2.2 and more specifically disclosed in MC CUTCHEON. Functional Materials, North American Edition. Glen Rock, N.J.: Manufacturing Confectioner Publishing Co., 1990. p. 110-129.

The method for preparing a dispersion of capsules preferably includes the following steps:
a) preparing a non-aqueous solution of compound A or B in a non-water soluble organic solvent; and
b) preparing an aqueous solution of compound B or A; and
c) dispersing the non-aqueous solution under high shear in the aqueous solution; and
d) optionally stripping the organic solvent from the mixture of the aqueous solution and the non-aqueous solution.

In another preferred embodiment, compound A or compound B can be emulsified in a liquid comprising water as a first step. The compound to be emulsified should be liquid at the reaction temperature. The droplets of compound A or B are preferably stabilised in the liquid comprising water. After the emulsion formation of compound A or B, the compound B or A is solved in the liquid comprising water so as to begin the reaction between compound A and B forming the resin having a moiety of formula (I), (II), and/or (III). Then the organic solvent may be omitted.

Regardless of the method of preparation of the resin capsules of the invention, the capsules are preferably stabilised by means of dispersing agents such as surfactants and polymeric dispersants. Suitable dispersing agents and polymeric dispersants are disclosed in § B.2.2.

In another preferred embodiment, extra compounds can be added to the dispersed phase. As these compounds do not participate in the formation of the resin having a moiety of formula (I), (II), and/or (III), a particle is formed having a core shell structure. The shell comprises the resin having a moiety of formula (I), (II), and/or (III), the core comprising the compound added in the dispersed phase and which did not participate in the formation of the resin. The compound added in the dispersed phase can be selected from the group of chemical reactants capable of forming a reaction product upon application of heat and/or light, colorants such as pigments or dyes, flame retardants, binders, perfumes, light stabilizers, conductive particles and polymers, magnetic particles.

The reactive chemistry in the core of the particle may be thermally reactive chemistry which is activated directly by heat or activated indirectly using an optothermal converting agent. In the latter, for example an infrared absorbing dye converts the infrared light of an infrared laser or infrared LEDs into heat. Examples of thermally reactive chemistry are disclosed in WO2015/158649 [0058-0066]. Most preferred thermally reactive chemistry include blocked isocyanates and more preferred examples of these blocked isocyanates are disclosed in the unpublished application EP17152872.2.

The reactive chemistry in the core may also be responsive to light, such as UV light. UV curable reactive chemistry contains one or more chemical reactants, such as a monomer, oligomer or polymer, which are curable by free radical polymerization or by cationic polymerization. In a preferred embodiment, the monomer, oligomer or polymer includes at least one acrylate group as polymerisable group. Preferred compounds which can be used in the core of the capsules of the invention are disclosed in WO2015/158649 [0068-0109].

The composition can be prepared in the presence of a catalyst, or an anticatalyst, or without any catalyst. The speed of stress-relaxation of the polymeric network can be therefore controlled by increasing or decreasing the speed of exchange reaction. Acid can increase the speed of the exchange reaction and base can slow down the exchange reaction.

In an embodiment, acids can be selected from acetic acid, trifluoracetic acid, etc. . . . ; and bases can be selected from DBU, dibutyamine etc. . . . . Organometallic catalyst can be used. In these embodiments, the catalyst can comprises an element selected from the group comprising tin, iron, lead, bismuth, mercury, titanium, hafnium, zirconium, and combinations thereof. In certain embodiments, the catalyst comprises a tin catalyst. Suitable tin catalysts, for purposes of the present invention, may be selected from tin(11) salts of organic carboxylic acids, e.g. tin(11) acetate, tin(11) octoate, tin(11) ethylhexanoate and tin(11) laurate. Preferably, the composition is prepared without any catalysts.

The capsules of the obtained aqueous dispersion have a numeric average diameter of between 10 nm and 100 μm, preferably between 10 nm and 10 μm, more preferably between 10 nm and 1 μm.

The obtained aqueous dispersion has an amount of resin between 1 wt. % and 80 wt. %, preferably between 5 and 50 wt. %, more preferably between 7 wt. % and 15 wt. %.

B. Inkjet Ink

The dispersion of the particles or capsules according to the invention is suitable to be incorporated in aqueous ink jet inks. The particles or capsules are preferably present in the inkjet ink in an amount of no more than 30 wt. %, preferably between 5 and 25 wt. % based on the total weight of the ink.

B.2.1. Solvent

The aqueous medium of the ink comprising the dispersion of particles of capsules according to the invention contains water, but may preferably include one or more water-soluble organic solvents. The one or more organic solvents may be added for a variety of reasons. For example, it can be advantageous to add a small amount of an organic solvent to improve the dissolution of a compound in the inkjet ink to be prepared. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino) ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (e.g., N,N-dimethylformamide), heterocycles (e.g., 2-pyrrolidone and N-methyl-2-pyrrolidone), and acetonitrile.

B.2.2. Colorants

The colorants which can be included in the ink jet ink according to the invention can be dyes or pigments.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments for use in the ink jet ink of the invention are disclosed in paragraphs [0128] to [0138] of WO 2008/074548. The pigment particles are dispersed in an aqueous medium using a polymeric dispersant, an anionic surfactant, but preferably a self-dispersible pigment is used.

The latter prevents interaction of the polymeric dispersant with the dispersing groups of resin capsules of the invention which may be included in the inkjet ink (see below), since dispersion stability of the pigment is accomplished by the same technique of electrostatic stabilization as employed for the resin capsules.

A self-dispersible pigment is a pigment having on its surface covalently bonded anionic hydrophilic groups, such as salt-forming groups or the same groups used as dispersing groups for the resin capsules, that allow the pigment to be dispersed in an aqueous medium without using a surfactant or a resin.

The technology for making self-dispersible pigments is well-known. For example, EP1220879 A discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP906371A discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function.

However for white pigment inkjet inks, the numeric average particle diameter of the white pigment is from about 50 to about 950 nm, more preferably from about 75 to about 750 nm, and still more preferably from about 100 to about 500 nm.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548. Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL-SPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000. The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.2.3. Resin

The ink jet ink composition according to the invention may further comprise an additional resin. The resin is often added to the ink jet ink formulation to achieve a good adhesion of the pigment to the fibres of the textile fabric. The resin is a polymer and suitable resins can be acrylic based resins, a urethane-modified polyester resin or a polyethylene wax.

The polyurethane resin is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin to be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention is at least 1 (wt.)% and preferably lower than 30 (wt.)%, more preferably lower than 20 (wt.)%.

B.2.3. Additives

The aqueous inkjet ink may further comprise a surfactant, a humectant, a biocide and a thickener as an additive.

Humectants are preferably incorporated in the inkjet ink to prevent the clogging of nozzles. The prevention is due to its ability to slow down the evaporation rate of the solvents, especially of the water in the ink. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol. The humectant is preferably added to the liquid formulation in an amount of 0.1 to 20 wt. % based on the total weight of the liquid.

Any known surfactant may be used in the inkjet ink of the invention. Preferably a glycol surfactant and/or an acetylene alcohol surfactant can be used. The use of the acetylene glycol surfactant and/or the acetylene alcohol surfactant further reduces bleeding to improve printing quality, and also improves the drying property in printing to allow high-speed printing. The acetylene glycol surfactant and/or the acetylene alcohol surfactant is preferably one or more selected from 2,4,7,9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1 010, or from Nissin Chemical Industry as Surfynol (registered trademark) 465 and Surfynol 61.

A biocide may be added to the ink to prevent unwanted microbial growth, which may occur in the liquid. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof. Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the ink liquid.

The inkjet ink may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), poly-vinylpyrrolidone, poly(2-vinylpyridine), poly(4-vinylpyridine) and poly(diallyldimethylammonium chloride).

The thickener is added preferably in an amount of 0.01 to 20 wt. %, more preferably 0.1 to 10 wt. % based on the ink.

C. Printing Method

Printing methods using aqueous inkjet inks comprising the dispersion of the invention include at least the steps of:
a) applying the aqueous inkjet ink containing the dispersed capsules of the invention by means of an inkjet technique onto a substrate; and b) applying heat to make the resin of the dispersed capsules flow.

In a digital textile printing process of the invention, the textile fabric used can be made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres.

In a first step of the digital textile printing method, a pre-treatment liquid containing a flocculant may be preferably applied to the fabric by spraying, coating, or pad printing. Alternatively, the pre-treatment liquid may also be applied to fabric using an ink jet head or valve jet head. These last means of applying the pre-treatment liquid have the advantage that the amount of required pre-treatment liquid is substantially lower than with the other application methods. By means of an ink jet head, it is possible to apply the pre-treatment liquid onto areas of the fabric where the image should be printed.

In a preferred embodiment of the invention, the pre-treatment liquid may comprises the dispersion according to the invention. More preferably, the capsules containing cationic dispersing groups is to be used in the pre-treatment liquid. When the pre-treatment agent is applied to fabric with an ink jet head, the particle diameter is preferably in the range 50 nm to 1 μm when determined by light scattering. A particle diameter larger than 1 μm tends to cause a deterioration in stability of jetting from the ink jet head. The particle diameter is more preferably 500 nm or less. Suitable ink jet head types for applying the pre-treatment liquid are piezoelectric type, continuous type, thermal print head type or valve jet type. Preferable capsules are the one with a core comprising a thermally reactive crosslinker and stabilised with cationic dispersing groups.

Fabric to which a pre-treatment liquid has been applied may be dried before applying a coloured image. After drying the pre-treated textile may optionally undergo a heat treatment, before the subsequent ink jetting step with ink. The heat treatment is preferably at 110 to 200° C., more preferably 130 to 160° C. Heating at 110° C. or higher enables the flow of the resin of the particle according to the invention or enables a thermally reactive crosslinker in the core of the particle to be fixed to the fibres of the fabric. Examples of the heating process include, but are not limited to, heat press, atmospheric steaming, high-pressure steaming and THERMOFIX. Any heat source can be used for the heating process; for example, an infrared ray lamp can be employed.

After the application of the pre-treatment liquid of the textile fabric, the aqueous inkjet ink according to the invention is jetted onto the substrate. Preferably the inkjet ink may comprise a colorant, more preferably a pigment.

After the ink jetting step, the printed fabric is dried and heated. The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step of the fabric is carried at a temperature preferably below 150° C., more preferably below 100° C., most preferably below 80° C. The heating step is preferably at 110 to 200° C., more preferably 130 to 160° C.

Another embodiment of the inkjet printing method according to the present invention includes at least the steps of: a) jetting an inkjet ink comprising a colorant and the dispersion containing resin capsules with a core comprising blocked isocyanates onto a substrate; and b) applying heat to make the resin of the capsules flow and to further activate the blocked isocyanates in the core of the particle. Suitable substrates are textile fabrics, leather, glass, ceramic, metallic, glass, wood, paper or polymeric surfaces. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm³ or more.

A preferred ink jet head for the inkjet printing system is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However the jetting of the ink according to the present invention is not restricted to piezoelectric inkjet printing. Other inkjet print heads can be used and include various types, such as a continuous type, a thermal print head type and a valve jet type.

If an optothermal converting agent is present in the core of the capsules of the invention, the heating mains may be a suitable light source. If the optothermal converting agent consists of one or more infrared dyes, an infrared light source is used. Any infrared light source may be used, as long as at least part of the emitted light is suitable for generation of heat. The infrared curing means may include an infrared laser, an infrared laser diode, infrared LEDs or a combination thereof.

EXAMPLES

Synthesis of Compound A-1: cyclohexane bis-acetoacetate

For the synthesis of cyclohexane dimethanol-bis-acetoacetate (0.2 mol) 30 g. (0.208 mol) of 4-(hydroxymethyl) cyclohexyl]methanol and 67.5 g. of tert-butyl acetoacetate were mixed in a round-bottom flask in 40 ml of xylene. The mixture was heated in an oil-bath at 135° C. for 2 h, under stirring, while distillation of tert-butanol was performed. After cooling the xylene was removed under reduced pressure (rotavopor, 80° C., 60 mbar). The addition of 60 ml isopropanol made the cyclohexane dimethanol bis-acetoacetae (CDM-AA) precipitate. Filtration was performed to isolate the product.

The synthesis was according to the following reaction:

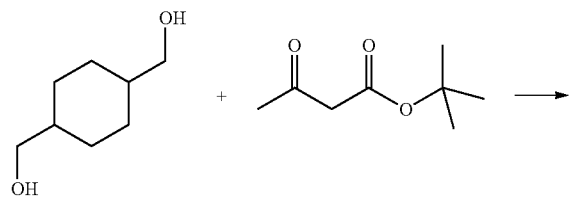

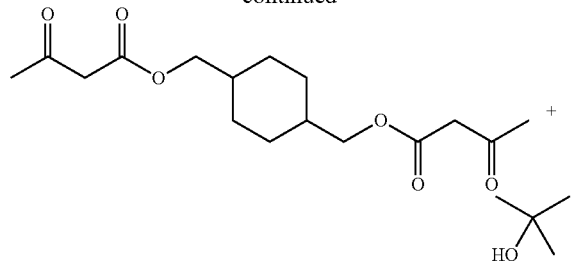

Synthesis of the Inventive Capsule Dispersion (Dispersion A)

Two different sizes of capsules were prepared, by varying the amount of surfactant.

First an aqueous solution (1) of compound B-1 was prepared. 1.41 g (1.5 eq) of m-xylylene diamine (Acros) and 1.01 g (1 eq) of tris(2-aminoethyl)amine (Sigma-Aldrich) were added to 89.5 g. distilled water. A second solution of 1.36 g. Agnique AAM 181D-F (BASF) was prepared in 35 g. dichloromethane (Acros). After dissolution of the Agnique AAM, 6.49 g. (3 eq) of the CDM-AA was added to the second solution (2).

The organic solution (2) is added to the aqueous solution (1), while vigorous stirring with an Ultra Turrax device during 5 minutes, at 15000 rpm was performed. After this emulsification step the dichloromethane was evaporated at a rotavapor instrument at 35° C.

The capsules were inspected under an optical microscope (Leica DMRM) and the particle size and distribution were determined with a Malvern Mastersizer 3000. A homogeneous dispersion of capsules was obtained. The capsules were found to have an average diameter of 318 nm.

Synthesis of the Capsules Containing a NIR-Absorber (Dispersion B)

First an aqueous solution (1) of amines was prepared. 1.41 g (1.5 eq) of m-xylylene diamine (Acros) and 1.01 g (1 eq) of tris(2-aminoethyl)amine (Sigma-Aldrich) were added to 89.5 g distilled water.

A second solution of 1.36 g. Agnique AAM 181D-F (BASF) was prepared in 35 g dichloromethane (Acros). After dissolution of the Agnique AAM, 6.49 g (3 eq) of the CDM-AA was added to the second solution. Hereafter, 0.262 g of NIR-dye (S2025 from FEW; 2.5% of the total dry capsule weight) is added and the solution was stirred during 5 minutes. (2).

The organic solution (2) was added to the aqueous solution (1), while vigorous stirring with an Ultra Turrax T25 device during 5 minutes, at 15000 rpm was performed. After this emulsification step, the dichloromethane was evaporated at a rotavapor instrument at 35° C.

The capsules were inspected under a visual microscope (Leica DMRM) and the particle size and distribution were determined with a Malvern Mastersizer 3000. A homogeneous dispersion of capsules was obtained. The capsules were found to have an average diameter of 331 nm.

Synthesis of Comparative Capsule Dispersion (Dispersion C)

A solution of 95.2 g Trixene BI7963 (a malonate blocked isocyanate supplied by Baxenden Chemicals LTD), 91 g Desmodur N75 BA (a trifunctional isocyanate supplied by Bayer AG) and 8 g Lakeland ACP 70 (a zwitterionic surfactant supplied by Lakeland Laboratories LTD) in 165 ml ethyl acetate was prepared and added to a solution of 23 g Lakeland ACP 70, 8 g lysine and 10.3 g triethanol amine in 310 g water, while stirring for 10 minutes using an Ultra-Turrax at a rotation speed of 18000 rpm. An additional 360 g water was added and the ethyl acetate and water were evaporated at 65° C. under reduced pressure to adjust the total weight of the dispersion to 600 g, while gradually increasing the vacuum from 500 mbar to 120 mbar. The dispersion was stirred for 16 hours at 65° C. The dispersion was allowed to cool down to room temperature and the dispersion was filtered over a 1.6 im filter.

The average particle size was measured using a Zetasizer™ Nano-S (Malvern Instruments, Goffin Meyvis). The average particle size was 186 nm.

Preparation of the Inventive Inkjet Ink INV-INK-1

The aqueous dispersion A was first filtered over 1.6 µm filter. Then, 22 g of dispersion A was mixed with 5 g Cab-O-jet 465M (10-20% Modified Pigment in water 80-90%, from Cabot Corporation). 8 g of glycerol (Sigma) was added to the dispersion. Water was removed from the solution by rotavapor until a total weight of 24.5 g was achieved. Another 1.5 g glycerol was added to the ink.

The dispersion was filtered over a 1.6 um filter. An additional 2 g of demineralized water was added. 0.1 g of a 30 wt. % sodium hydroxide was added to the ink.

Preparation of the Comparative Inkjet Ink COMP-INK-1

The comparative ink COMP-INK-1 was prepared by mixing the components according to Table 3. All weight percentages are based on the total weight of the ink jet ink.

TABLE 3

| Compound | Wt. % |
| --- | --- |
| Dispersion C | 40.0 |
| Cab-o-Jet 465M | 25.0 |
| Alkanol XC (anionic surfactant, Dupont) | 0.25 |
| 28 w % ammonia | 0.75 |
| 1,2-propane diol | 34.0 |

Comparative ink COMP-INK-1 was filtered over a 1.6 µm filter.
COMP-INK-2

As COMP-INK-2, Bordeaux Eden PG MV pigment yellow ink was purchased. This ink is a pigment-in-binder ink for textile printing.

Example 1

Printing Tests on Textile Fabrics

COMP-INK-1, COMP-INK-2 and INV-INK-1 were jetted with a DIMATIX printer (Fuji Corporation). All nozzles were printing after a few manual purging steps and a purge/blot sequence. The head-voltage was set on 22.2-23.2 V or 18.9-20.8 V. The firing Frequency was 5 kHz and the head temperature was 24° C. During printing, intermediate purging was performed every 65 lines. No failing nozzles were observed.

Jetting was performed on three different fabrics:
1. Mixed fibre fabric (polyester/cotton: Poly without coating from Premier Textiles 2395)
2. Cotton fabric (6978 Cotton without coating from Premier Textiles)
3. Polyester fabric (Portland without coating from Premier Textiles)

The printed samples were dried and heated at 160° C. for 6 minutes.

The dry crock fastness was evaluated of the printed samples by means of a Crockmeter SDL ATLAS M238AA according to ISO 105 X12. The results are summarised in Table 4.

TABLE 4

| INK | Fabric | Dry crock fastness |
| --- | --- | --- |
| COMP-INK-1 | Cotton fabric | 3.0 |
| COMP-INK-1 | Mixed fibre fabric | 4.2 |
| COMP-INK-2 | Cotton fabric | 13 |
| COMP-INK-2 | Mixed fibre fabric | 12 |
| COMP-INK-2 | Polyester fabric | 20 |
| INV-INK-1 | Cotton fabric | 4.8 |
| INV-INK-1 | Mixed fibre fabric | 2.0 |
| INV-INK-1 | Polyester fabric | 5.8 |

A crock value below 6.0 is acceptable, between 6.0 and 8.5 moderate, and above 8.5 is a bad crock value. In conclusion, the inventive ink based on the dynamic chemistry outperformed the commercial available ink (COMP-INK-2) on all three different textile fabrics. From the results it can further be seen that the printed samples with the inventive ink show comparable dry crock fastness values (below 6.0) as printed samples with comparative inks containing capsules comprising isocyanates (COMP-INK-1). The same conclusions can be drawn for wet crock fastness values. Therefore, a significant advantage compared to the current state-of-art is achieved.

Example 2

Printing Tests on Metal Substrate

INV-INK-1 was jetted the same way as described above, however the fabrics were replaced by stainless steel plates.

The adhesion on stainless steel was evaluated by peel-off test (ISO 4624) with tape. No ink was transferred from the substrate to the tape, showing a very good adhesion of the capsules of the dispersion according to the invention to metal surfaces.

The invention claimed is:
1. An aqueous dispersion of capsules comprising:
capsules including a shell surrounding a core, the shell including a resin including at least one repeating unit according to formula I, II, and/or III:

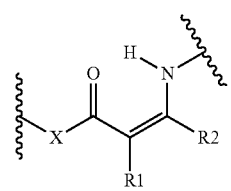

I

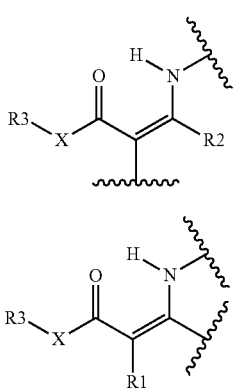

wherein
R1 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, COR4, and CN;
R2 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, and COR4;
R1 and R2 may represent atoms necessary to form a five to eight membered ring;
R3 is selected from the group consisting of a substituted or unsubstituted alkyl group, a substituted or unsubstituted alkenyl group, a substituted or unsubstituted alkynyl group, and a substituted or unsubstituted aryl or heteroaryl group;
R4 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, OR5, and NR6R7;
R5 is selected from the group consisting of a substituted or unsubstituted alkyl group, a substituted or unsubstituted alkenyl group, a substituted or unsubstituted alkynyl group, and a substituted or unsubstituted aryl or heteroaryl group;
R6 and R7 are independently selected from the group consisting of a hydrogen, a substituted or unsubstituted alkyl group, a substituted or unsubstituted alkenyl group, a substituted or unsubstituted alkynyl group and a substituted or unsubstituted aryl or heteroaryl group;
R6 and R7 may represent atoms necessary to form a five to eight membered ring;
X is selected from the group consisting of O, NR8, and CR9R10;
R8, R9, and R10 are independently selected from the group consisting of a hydrogen, a substituted or unsubstituted alkyl group, a substituted or unsubstituted alkenyl group, a substituted or unsubstituted alkynyl group, and a substituted or unsubstituted aryl or heteroaryl group;
R8 and R3 may represent atoms necessary to form a five to eight membered ring;
any of R3, R9, and R10 may represent atoms necessary to form a five to eight membered ring;
the aqueous dispersion of capsules is obtainable by contacting, in a liquid including water, a compound A including at least 2 functional groups selected from the group consisting of —X—C(=O)—CHR1-C(=O)—R2, —X—C(=O)—C≡C—R2, and —X—C(=O)—CR1=CR2-NR11R12, with a compound B including at least two selected from the group consisting of —NH2, —NH3+, and —N=C=O; and
R11 and R12 are independently selected from the group consisting of a hydrogen, a substituted or unsubstituted alkyl group, a substituted or unsubstituted alkenyl group, a substituted or unsubstituted alkynyl group, and a substituted or unsubstituted aryl or heteroaryl group.

2. The aqueous dispersion according to claim 1, wherein the resin includes a moiety according to formula I and X represents O.

3. The aqueous dispersion according to claim 1, wherein the compound A includes at least two of the functional groups —X—C(=O)—CHR1-C(=O)—R2.

4. The aqueous dispersion according to claim 1, wherein the compound A includes two of the functional groups —X—C(=O)—CHR1-C(=O)—R2, in which R1 represents a hydrogen, and R2 is selected from the group consisting of a substituted or unsubstituted alkyl group and a substituted or unsubstituted aryl group.

5. The aqueous dispersion according to claim 2, wherein the liquid is a mixture of water and non-water soluble organic solvent.

6. The aqueous dispersion according to claim 2, wherein the core includes one or more chemical reactants capable of forming a reaction product upon application of heat and/or light.

7. An ink jet ink comprising:
water; and
the aqueous dispersion of capsules as defined in claim 1 in which the capsules are present in an amount from 5 wt. % to 30 wt. % with respect to a total weight of the ink.

8. An ink jet ink comprising:
water; and
the aqueous dispersion of capsules as defined in claim 2 in which the capsules are present in an amount from 5 wt. % to 30 wt. % with respect to a total weight of the ink.

9. The ink jet ink according to claim 8, further comprising a pigment.

10. The ink jet ink according to claim 9, further comprising a water miscible organic solvent.

11. A method of producing the aqueous dispersion of capsules as defined in claim 1, the method comprising the steps of:
preparing a non-aqueous solution of the compound A or the compound B in a non-water soluble organic solvent;
preparing an aqueous solution of the compound B or the compound A; and
dispersing the non-aqueous solution under shear in the aqueous solution.

12. A method of producing the aqueous dispersion of particles as defined in claim 2, the method comprising the steps of:
preparing a non-aqueous solution of the compound A or the compound B in a non-water soluble organic solvent;
preparing an aqueous solution of the compound B or the compound A; and
dispersing the non-aqueous solution under high shear in the aqueous solution.

13. An ink jet printing method comprising the steps of:
jetting the inkjet ink as defined in claim 7 onto a substrate; and
applying heat to achieve a temperature of the resin between 30° C. and 150° C.

14. An inkjet printing method comprising the steps of:
jetting the inkjet ink as defined in claim 8 onto a substrate; and
applying heat to achieve a temperature of the resin between 30° C. and 150° C.

15. The inkjet printing method according to claim 13, wherein the substrate is a textile fabric.

16. The inkjet printing method according to claim 14, wherein the substrate is a textile fabric.

17. The ink jet ink according to claim 7, further comprising a pigment.

18. The ink jet ink according to claim 17, further comprising a water miscible organic solvent.

\* \* \* \* \*